United States Patent [19]
McIntyre et al.

[11] Patent Number: 6,163,361
[45] Date of Patent: Dec. 19, 2000

[54] DIGITAL CAMERA INCLUDING A PRINTER FOR RECEIVING A CARTRIDGE HAVING SECURITY CONTROL CIRCUITRY

[75] Inventors: Dale F. McIntyre, Honeoye Falls; David L. Patton, Webster, both of N.Y.

[73] Assignee: Eastman Kodak Company, Rochester, N.Y.

[21] Appl. No.: 09/298,532

[22] Filed: Apr. 23, 1999

[51] Int. Cl.[7] .......................... G03B 29/00; G03B 13/14; H04N 7/167; H04N 1/23; H04Q 19/00

[52] U.S. Cl. .................. 355/18; 347/214; 380/10; 380/4; 358/296; 340/572.7; 340/568.1; 340/825.54

[58] Field of Search .................. 355/18, 1, 2, 133; 348/207, 441; 380/30, 54, 4, 80; 713/719; 347/214; 346/76; 399/366; 340/825.54, 568.1, 572.7

[56] References Cited

U.S. PATENT DOCUMENTS

| | | | |
|---|---|---|---|
| 4,670,857 | 6/1987 | Rackman | 380/4 |
| 4,901,090 | 2/1990 | Ozawa et al. | 346/76 |
| 4,982,209 | 1/1991 | Pearson | 354/21 |
| 5,005,200 | 4/1991 | Fischer | 380/30 |
| 5,027,401 | 6/1991 | Soltesz | 380/54 |
| 5,296,874 | 3/1994 | Nagata et al. | 346/76 |
| 5,499,294 | 3/1996 | Friedman | 713/719 |
| 5,752,152 | 5/1998 | Gasper et al. . | |
| 5,768,674 | 6/1998 | Gasper et al. . | |
| 5,772,250 | 6/1998 | Gasper . | |
| 5,864,742 | 1/1999 | Gasper et al. . | |
| 5,875,034 | 2/1999 | Shintani et al. | 358/296 |
| 5,959,530 | 9/1999 | Lupien, Jr. et al. | 340/568.1 |
| 6,035,677 | 3/2000 | Janssen et al. | 70/278.3 |
| 6,037,879 | 3/2000 | Tuttle | 340/825.54 |
| 6,040,849 | 3/2000 | McIntyre et al. | 347/214 |
| 6,043,746 | 3/2000 | Sorrells | 348/572.7 |

*Primary Examiner*—Russell Adams
*Assistant Examiner*—Raghuveer Bindingnavele
*Attorney, Agent, or Firm*—Raymond L. Owens

[57] ABSTRACT

A digital camera is disclosed which includes a printer for printing images onto a receiver having preformed authenticating information, the receiver being formed in a cartridge which is insertable into the printer. The camera captures and digitizes an image of a scene and stores the captured digitized scene image. The cartridge includes security control circuitry having a predetermined code for enabling the printer. The printer includes a print station adapted to print the captured digitized scene image in relation to the preformed authenticating information on the receiver; and receives the cartridge having the receiver and advances the receiver past the print station; logic and control circuitry is responsive to the inserted cartridge for receiving the predetermined code to enable the printer, and is also responsive to the captured digitized scene image for causing the receiver to advance past the print station and for providing signals to the enabled printer in response to the captured digitized scene image for causing the printer to print an image on the receiver in relation to the preformed authenticating information on the receiver.

9 Claims, 10 Drawing Sheets

DIGITAL CAMERA INCLUDING A PRINTER FOR RECEIVING A CARTRIDGE HAVING SECURITY CONTROL CIRCUITRY

CROSS REFERENCE TO RELATED APPLICATIONS

Reference is made to commonly assigned U.S. patent application Ser. No. 09/165,066 filed Oct. 2, 1998 entitled "Receiver Having Authenticating Marks" by Gustavo R. Paz-Pujalt et al, U.S. patent application Ser. No. 09/199,291 filed Nov. 24, 1998, entitled "Insertable Thermal Printer Cartridges for Digital Camera" by Dale F. McIntyre et al, U.S. Ser. No. 09/198,746 filed Nov. 24, 1998, entitled "Insertable Cartridge for Digital Camera With Ink Jet Printer, by Dale F. McIntyre et al, U.S. patent application Ser. No. 09/103,019 filed Jun. 23, 1998, entitled "Forming Authenticated Images in a Receiver" by Gustavo R. Paz-Pujalt et al, U.S. patent application Ser. No. 09/274,638 filed Mar. 23, 1999 the disclosures of which are incorporated herein by reference.

FIELD OF THE INVENTION

This invention relates to digital cameras which include printers for printing images of a scene on receivers having preformed authenticating information.

BACKGROUND OF THE INVENTION

Heretofore images of high quality have been produced by thermal printers. In a typical thermal printer an image is formed in three passes. First a dye donor having color such as yellow is placed in dye transfer relationship with a receiver and then the dye donor is heated in a pattern corresponding to the yellow portion of an image to be completed. Thereafter, cyan and magenta portions of the image are formed in a similar fashion. The completed color image on the receiver is continuous tone and in many cases can rival photographic quality.

In one type of thermal printer which prints colored images, a donor contains a repeating series of spaced frames of different colored heat transferable dyes. The donor is disposed between a receiver, such as coated paper, and a print head formed of, for example, a plurality of individual heating resistors. When a particular heating resistor is energized, it produces heat and causes dye from the donor to transfer to the receiver. The density or darkness of the printed color dye is a function of the energy delivered from the heating element to the donor.

Thermal dye transfer printers offer the advantage of true "continuous tone" dye density transfer. This result is obtained by varying the energy applied to each heating element, yielding a variable dye density image pixel in the receiver.

Thermally printed images are used in a number of different applications. In one of those applications, so-called "sticker prints" are made on a receiver and arranged so that they can be peeled off and individually pasted onto another surface. However, these stickers are not used in situations which require that they be "authentic". By use of the term "authentic" is meant that the image can indicate to a viewer or a reader with a high degree of certainty that the image has not been counterfeited.

SUMMARY OF THE INVENTION

It is an object of the present invention to provide a security control arrangement for insuring that the printer in a digital camera only prints images on valid receivers having preformed authenticating information.

This object is achieved in a digital camera including a printer for printing images onto a receiver having preformed authenticating information, the receiver being formed in a cartridge which is insertable into the printer, comprising:

(a) the camera including means for capturing and digitizing an image of a scene and means for storing the captured digitized scene image;

(b) the cartridge including security control circuitry having a predetermined code for enabling the printer; and (c) the printer including:

(i) a print station adapted to print the captured digitized scene image in relation to the preformed authenticating information on the receiver; and (ii) means for receiving the cartridge having the receiver and for advancing the receiver past the print station;

(d) logic and control means including means responsive to the inserted cartridge for receiving the predetermined code to enable the printer, and means responsive to the captured digitized scene image for causing the advancing means to advance the receiver past the print station and for providing signals to the enabled printer in response to the captured digitized scene image for causing the printer to print an image on the receiver in relation to the preformed authenticating information on the receiver.

It is a feature of the present invention that a digital camera which is equipped with a printer can be used to print images on a receiver having preformed authenticating information in an efficient and cost effective manner while ensuring that images are only printed on valid receivers which are preloaded in a cartridge with a security control circuit.

An advantage of the present invention is that it effectively authenticates images preventing counterfeiting, misuse or fraud.

A further feature of the invention is that the preformed authenticating information can be in the form of silver impregnated threads or magnetic strip material or in an encoded form that requires a device such as a bar code reader to scan the images and decode the preformed authenticating information. The preformed authenticating information can form water marks.

Another feature of the invention is that the preformed authenticating information can be embossed.

Another feature of the present invention is that it facilitates the design of images to be authenticated such as postage stamps, travelers checks, checks and other types of official documents.

A still further feature is that the images and authenticating information can be formed on stickers which can be peeled apart from the receiver and used for a number of purposes such as a postage stamps.

BRIEF DESCRIPTION OF THE DRAWINGS

FIG. 3b shows more detailed block diagrams of RF transponders 100 and 102 shown in FIG. 3a;

DETAILED DESCRIPTION OF THE INVENTION

The overall structure of the present invention will briefly be reviewed with respect to FIGS. 1, 2, 6 and 7. The present invention uses an insertable thermal printer cartridge 10 which is inserted into a digital camera 11. The digital camera 11 includes a thermal printer 13 an example of which is the PTMTL1101A manufactured by the ALPS Electric Company LTD. Insertable thermal printer cartridge 10 includes colorant donor element 21 and receivers 30 which can include at least a colorant receiving layer 60 with preformed authenticating information 70. Although a thermal printer 13 is shown it will be understood that other types of included printers, such as ink jet printers can also be used in accordance with the present invention.

Figure 1:
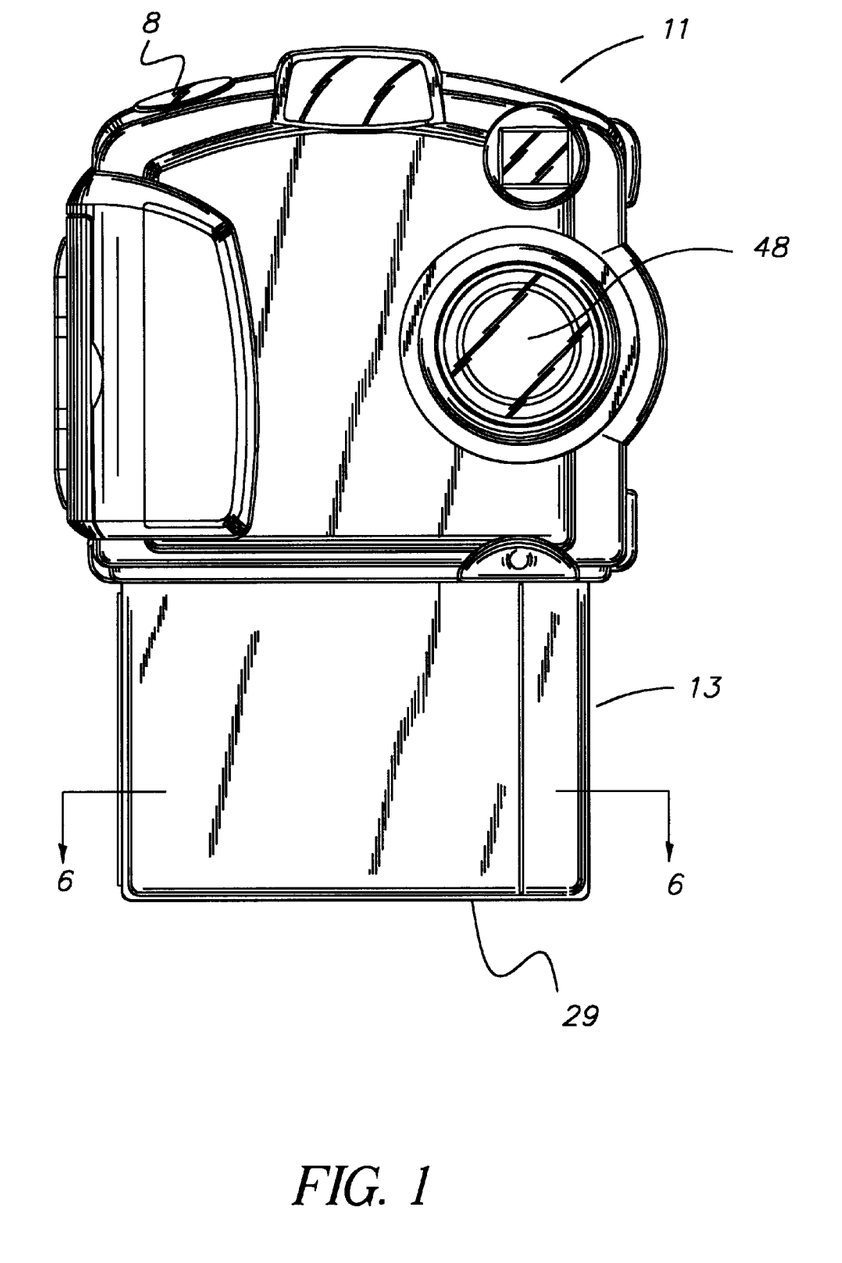
FIG. 1 is a front view of a digital camera having a thermal printer for printing captured digitized scene images onto receivers with preformed authenticating information.

FIG. 1 shows a front view of the digital camera 11 including a lens 48 for focussing light from a subject onto an image sensor 40 (see FIG. 3a) upon depression of a shutter button 8. The digital camera 11 further includes the thermal printer 13 for producing hardcopy images of the captured digitized scene image onto receivers 30. The insertable thermal printer cartridge 10 is inserted into thermal printer 13 by opening insertable thermal printer cartridge bay door 29 shown here in its closed position.

Figure 2:
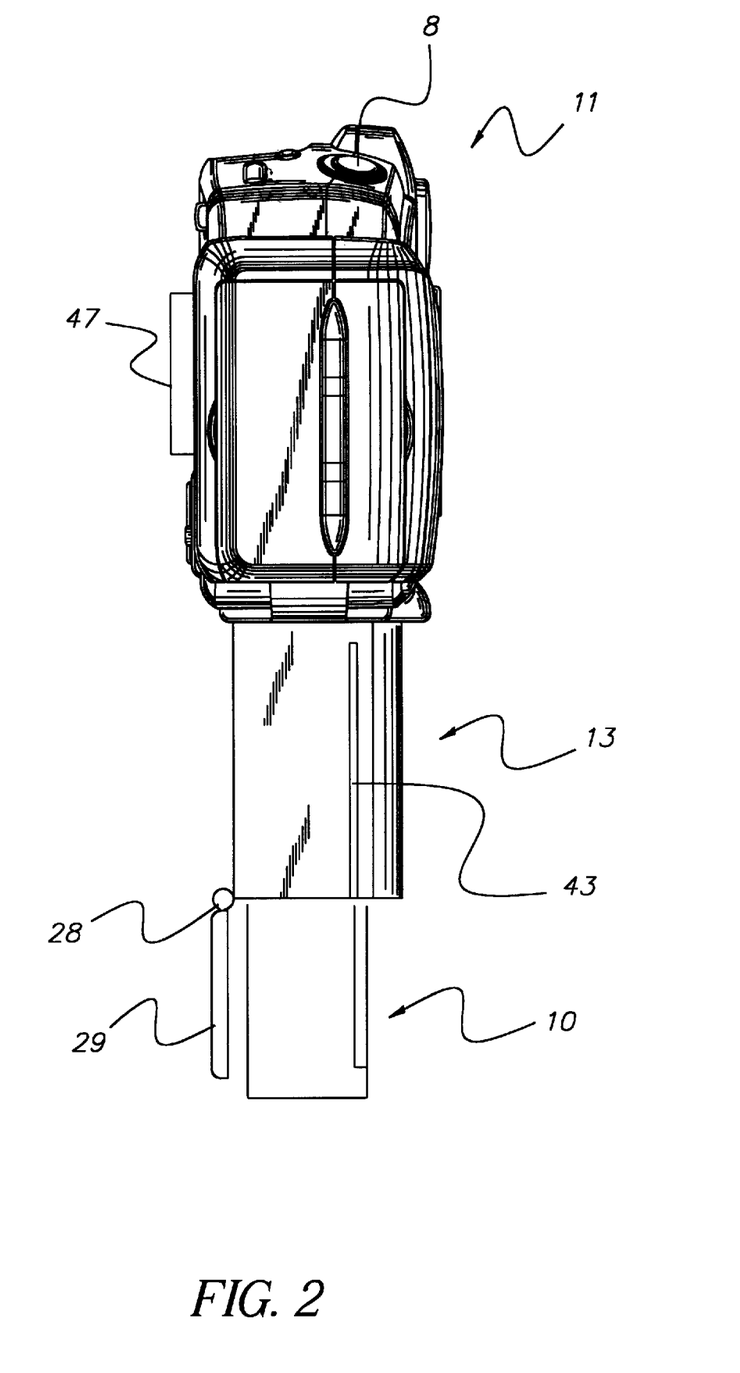
FIG. 2 is a side view of the digital camera of FIG. 1.

Turning to FIG. 2, the digital camera 11 is shown from a side view with included thermal printer 13 again in a general fashion. FIG. 2 shows the arrangement of FIG. 1 as a side view when insertable thermal printer cartridge bay door 29 is rotated into an open position about hinge 28 for insertion of the insertable thermal printer cartridge 10 into the insertable thermal printer cartridge bay 10a (See FIG. 4) of thermal printer 13. In this position, a liquid crystal display (LCD) window 47 is shown and is used during operation of digital camera 11 for reviewing captured digitized scene images stored in memory 51 (See FIG. 3a).

Figure 3A:
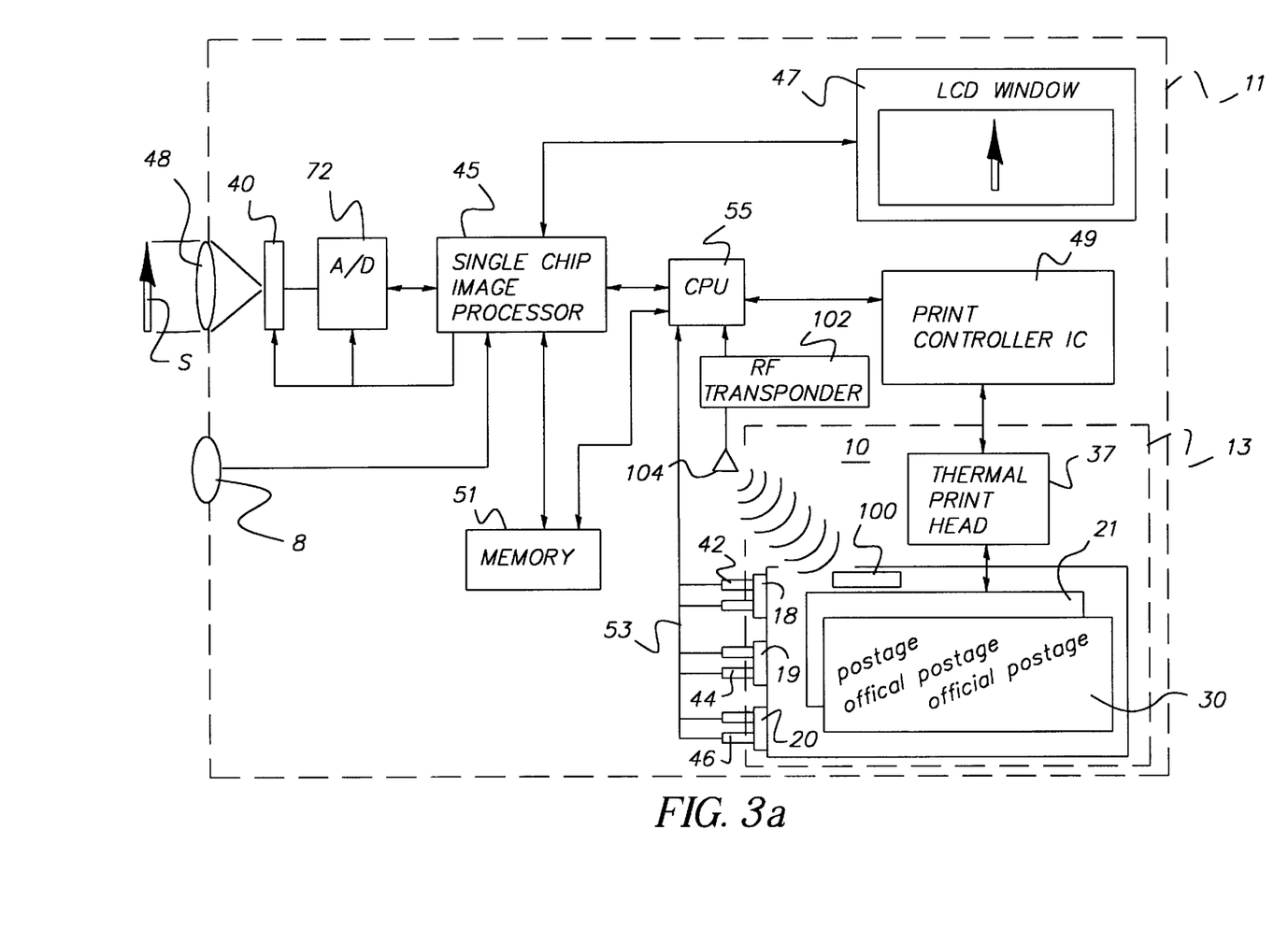
FIG. 3a is a system block diagram of the digital camera with the thermal printer.

FIG. 3a shows a system block diagram of the digital camera 11 with the thermal printer 13. Light reflecting from subject S is collected and focussed onto the image sensor 40 by lens 48 upon depression of the shutter button 8. The timing control of the image sensor 40 is accomplished by a single chip image processor 45 which for example can be commercially available chip DCAM-103 manufactured by LSI Logic Corporation. The single chip image processor 45 includes embedded general purpose input/output circuitry (I/O) for reading and reacting to user manipulated camera mode control switches (not shown) and the shutter button 8. The single chip image processor 45 also controls various other parameters and data flow within the image capture section of the digital camera 11. For example, the conversion of signals from image sensor 40 to digital form is accomplished with a conventional A/D converter 72 under the control of the single chip image processor 45. Single chip image processor 45 also manages the interface to the memory 51 shown generally as a block. It will be understood that memory 51 can be a read only memory (ROM), dynamic random access memory (DRAM), or a conventional compact flash card removable memory as described by the above referred to chip DCAM-103 and Architecture Specification available from LSI Logic Corporation. Captured digitized scene images maybe stored in DRAM or Compact Flash removable media shown as memory 51. The single chip image processor 45 furthermore displays captured digital images on LCD window 47 as it contains an embedded LCD controller.

Continuing with FIG. 3a, a central processing unit (CPU) 55 is shown connected to the single chip image processor 45. CPU 55 is a conventional multipurpose microprocessor nominally used to manage the functions of thermal printer 13. CPU 55 reads an I/O bus 53 to react to a user choosing to print a captured digitized scene image shown on LCD window 47 via camera mode control switches (not shown). CPU 55 also communicates via a standard serial bus connection with security control circuitry which includes an RF transponder 102 and an antenna 104 to interrogate a cartridge RF transponder 100 for a predetermined code contained within cartridge 10 which further includes valid receivers 30. The RF transponder 102 sends and receives radio signals. The cartridge 10 includes a cartridge RF transponder 100 for sending and receiving radio signals and in response to a received signal from the RF transponder 102 the cartridge RF transponder 100 sends a signal having the predetermined code to the antenna 104 which transmits such signal to the RF transponder 102. The CPU 55 is coupled to the RF transponder 102 and is programmed for receiving the predetermined code to enable the printer 13.

The cartridge RF transponder 100 includes a memory location that is used for holding a number corresponding either to the number of receivers 30 or to the number of peelable stickers 92 (See FIG. 9) included in the cartridge. The counter can be included within the RF converter 112. The counter is decremented each time the printer 13 is actuated. When the counter is decremented to zero, the cartridge RF transponder 100 is inhibited. For an example of a commercially available device corresponding to cartridge RF transponder 100, see Texas Instruments Registration and Identification System known as TIRIS. Texas Instruments publishes a technical specification 11-09-21-032 dated July 1997 which is incorporated by reference. The RF transponder 102 and antenna 104 are also commercially available from Texas Instruments and identified as Micro-reader Model RI-STU-MRD1.

Figure 3B:
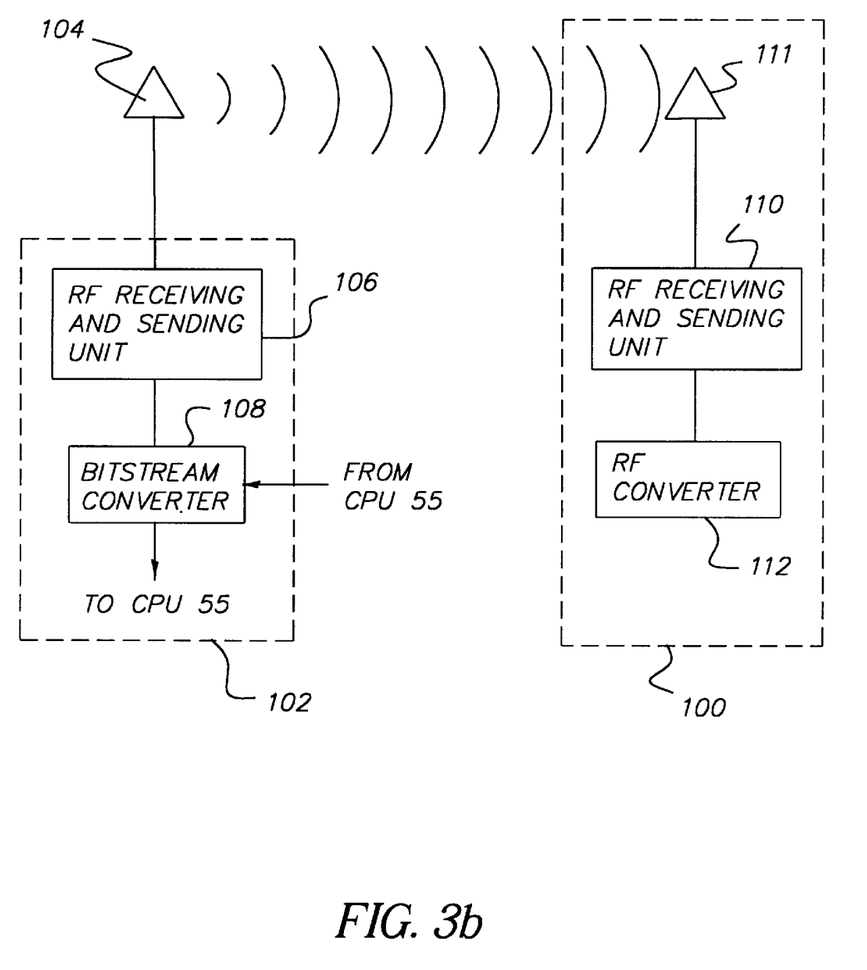

Turning now to FIG. 3b where a block diagram of the RF transponder 102 of the digital camera 11 is shown. The antenna 104 is connected to an RF receiving and sending unit 106. RF receiving and sending unit 106 is connected to a bitstream converter 108. The bitstream converter 108 operates in a bimodal fashion. It sends signals to the CPU 55 which are converted from the received signals by the antenna 104. It also receives signals from the CPU 55, converts them to a bitstream and applies them to the RF receiving and sending unit 106 which sends RF signals to the RF transponder 100. The RF signals sent to the RF transponder 102 have a predetermined code provided by RF transponder 100. The CPU 55 receives the predetermined code and in response thereto enables the printer.

The RF transponder 100 includes a receiving and sending unit 110. The RF transponder 100 is shown to include an antenna 111. The RF transponder 100 sends RF signals in response to signals produced by the RF converter 112 which provide the predetermined code used to enable the printer 13. In response to a predetermined received signal from the RF transponder 102, an RF converter 112 is enabled and causes the transmission of the predetermined code. It will be understood that there need not be RF signals generated, but that the RF transponders 100 and 102 could be directly electrically connected to each other by appropriate contacts after the cartridge 10 is inserted into the digital camera 11.

Programming of CPU 55 causes a flow of data to a printer controller IC 49 an example of which can be commercially available chip PTCTS 1008A manufactured by the ALPS Electric Corporation. Printer controller IC 49 modulates the current flow to individual resistive heating elements (not shown) of a thermal head 37 to supply energy to transfer colorant from colorant donor element 21 to receiver 30 in a manner well understood in the art. Identifying contacts 18, 19, and 20 of insertable thermal printer cartridge 10 are interrogated by CPU 55 through the connection of I/O bus 53 to identifying probe pairs 42, 44, and 46 which are in intimate contact with identifying contacts 18, 19, and 20. For a more complete discussion of the functionality of identifying contacts 18, 19, and 20, please refer to the discussion of FIG. 5. As will subsequently be described, the printer controller IC 49 causes the advancement of the receiver 30 and the colorant donor element 21 past a print station 35 and for providing signals to the thermal head 37 in response to the captured digitized scene image for causing the thermal printer 13 to print an image on the receiver 30 in relation to the preformed authenticating information 70. The structure necessary to accomplish these functions will be described in relation to FIGS. 4–6.

Figure 4:
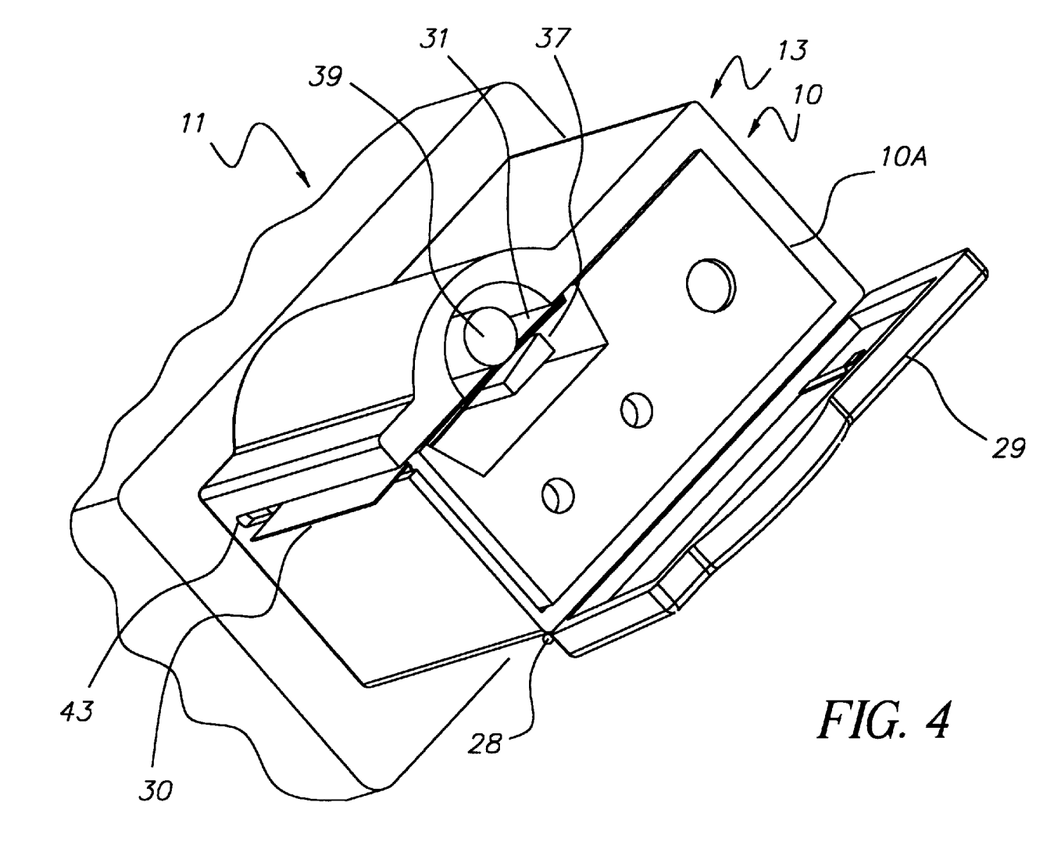
FIG. 4 is an exploded perspective of the thermal printer of the digital camera and an insertable thermal printer cartridge being inserted into the thermal printer of the digital camera.

Turning now to FIG. 4, insertable thermal printer cartridge 10 is shown protruding from insertable thermal printer cartridge bay 10a with insertable thermal printer cartridge bay door 29 in an open position for insertion of the insertable thermal printer cartridge 10 into the insertable thermal printer cartridge bay 10a of thermal printer 13. Receivers 30 are shown relative to pressure roller 39, colorant donor element 21 (not visible), and thermal head 37. Receiver 30, while receiving colorant transferred from colorant donor element 21 via thermal head 37, must leave the thermal printer 13 through a printer egress slot 43. In a manner well known in the art, receiver 30 moves in and out of the printer egress slot 43 to accommodate a plurality of printing operations wherein a single colorant to be transferred can be the commonly used cyan, yellow, magenta and black (CYMK) colorant scheme.

In operation, the insertable thermal printer cartridge 10 is inserted into the insertable thermal printer cartridge bay 10a which has features corresponding to the insertable thermal printer cartridge housing 9 for receiving the insertable thermal printer cartridge 10 containing receivers 30 on receiver supply spool 25. Identifying contacts 18, 19, and 20 provide feature identification to the CPU 55 for controlling the operation of the thermal printer 13 as shown in FIG. 3. Receivers 30 on receiver supply spool 25 are caused to be advanced by the CPU 55 through printer controller IC 49 which actuates the receiver drive sprocket 17 (See FIG. 5). The receiver drive sprocket 17 is coupled to the receiver supply spool 25. In a similar fashion, colorant donor element 21 is caused to be moved from the donor supply roll 23 onto the donor take-up spool 24 by the CPU 55 (via printer controller IC 49) actuating the donor drive shaft 80, shown in FIG. 6, which is mechanically coupled to the donor take-up spool 24. It will be understood that a drive motor (not shown) is actually driven by signals from the printer control IC 49. The receiver drive sprocket 17 is driven by a gear 84 controlled by a motor 86 operated by a signal from the printer controller IC 49 (see FIG. 3). This arrangement in the thermal printer 13 continuously advances the receiver 30 and colorant donor element 21 relative to the heating elements (not shown) of the thermal head 37 at the print station 35. As will be clear to those skilled in the art, the motors used in the present invention can be continuous DC motors. Programming of CPU 55 is responsible for the mechanical positioning of the receivers 30 and colorant donor elements 21 at the print station 35. Furthermore, it formats the printing of the captured digitized scene image relative to areas of receiver 30 that don't contain preformed authenticating information as evident from FIG. 9. CPU 55 formats the captured digitized scene image based on information gathered from interrogation of identifying contacts 18, 19 and 20 as described in Table 1 below.

It will also be understood that receivers 30 are temporarily connected along the length of receivers 30 by orthogonal lines of perforations 41 (see FIG. 5) permitting the color print to be conveniently detached from unused receivers 30 within insertable thermal printer cartridge 10.

Figure 5:
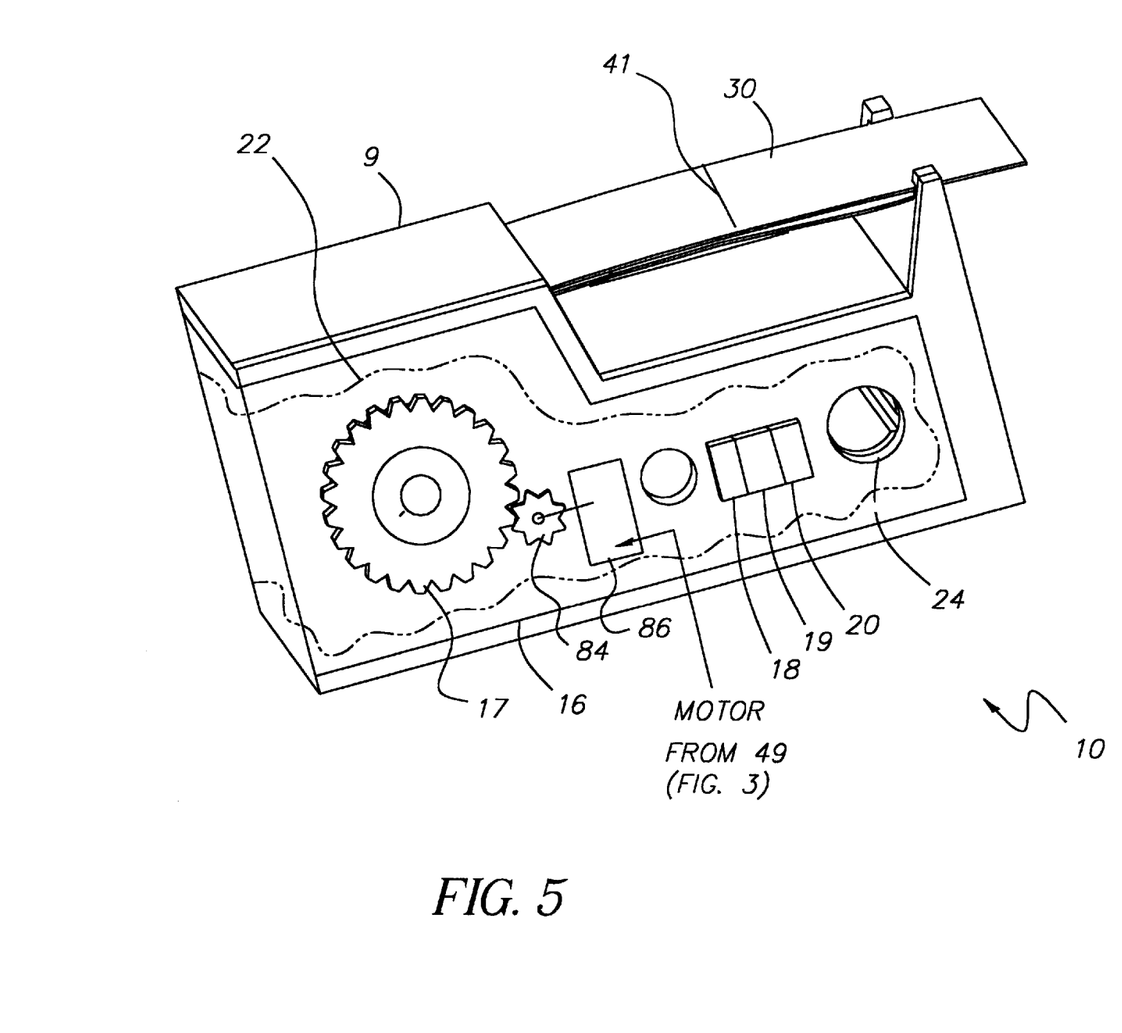
FIG. 5 is a perspective of an insertable thermal printer cartridge with receiver drive sprocket and identifying contacts for use with a digital camera having a thermal printer.

Following on with FIG. 5, a perspective of the insertable thermal printer cartridge 10 is shown with a section of a receiver 30 extending from an insertable thermal printer cartridge housing 9. The insertable thermal printer cartridge housing 9 is provided with a removable cartridge seal 16 which protects identifying contacts 18, 19, and 20, receiver drive sprocket 17, and donor take-up spool 24 prior to the use of the insertable thermal printer cartridge 10. In this manner, features of the insertable thermal printer cartridge 10 such as identifying contacts 18, 19, and 20 are protected from damage. Similarly, the receiver drive sprocket 17 is prevented from unintentionally advancing receivers 30. Cartridge seal 16 can be of a Mylar sheet held in position until use by a conventional low tack adhesive 22 as cartridge seal 16 is only used as a protective seal. Cartridge seal 16 is removed prior to inserting the insertable thermal printer cartridge 10 into the insertable thermal printer cartridge bay 10a provided in the digital camera 11 (See FIG. 4). It will be understood that cartridge seal 16 can contain human readable data printed on the outer surface (not shown) indicative of the date of manufacture, expiration date, printer compatibility, etc. Alignment features are assembled in the housing 9 and shown as a donor take-up spool 24 and the receiver drive sprocket 17 which are used in the positioning of insertable thermal printer cartridge 10 into thermal printer 13.

Identifying contacts 18, 19, and 20 can be formed by the application of an encoded and patterned metallized tape. These identifying contacts 18, 19 and 20 provide the information used for determining if the receiver 30 has preformed authenticating information 70 and the position of its placement. Each identifying contact 18, 19, and 20 may be metalized or not forming a conductive or non-conductive area. These identifying contacts 18, 19, and 20 provide information of features of the inserted insertable thermal printer cartridge 10 to the thermal printer 13 in the digital camera 11. These identifying contact 18, 19, and 20 provide information in a manner similar to the DX encodement of 35 mm film cassettes. For example, see commonly-assigned U.S. Pat. No. 4,982,209 to Pearson. The identifying contact 18, 19, and 20 are used by the CPU 55 to sense the data represented by the encoded conductive pattern. Such data can represent the manufactured configuration of the insertable thermal printer cartridge 10 with respect to the preformed authenticating information 70 of receivers 30 such as postal amount, stamp style (placement of preformed authenticating information 70) and quantity of receivers 30 as shown in Table 1 below. Table 1 is in reference to the situation where the digitized capture scene images are applied to receivers having preformed authenticating information to form postage stamps.

TABLE 1

| Manufactured configuration of insertable thermal printer cartridge 10 | Identifying Contact 20 | Identifying Contact 19 | Identifying Contact 18 |
|---|---|---|---|
| First Class Rate/Style 1/(10) | L | L | L |
| First Class Rate/Style 1/(20) | L | L | H |
| First Class Rate/Style 2/(10) | L | H | L |
| First Class Rate/Style 2/(20) | L | H | H |
| Post Card Rate/Style 1/(10) | H | L | L |
| Post Card Rate/Style 1/(20) | H | L | H |
| Post Card Rate/Style 2/(10) | H | H | L |
| Post Card Rate/Style 2/(20) | H | H | H |

Logic levels shown in Table 1 describe the identification of the contents of insertable thermal printer cartridge 10 with respect to the type and quantity of receivers 30. The amount of colorant donor element 21 provided during manufacture of a donor supply roll 23 is determined in accordance with the number of receivers to be printed. The identification is accomplished by identifying probe pairs 42, 44, and 46 (see FIG. 3) contacting identifying contacts 18, 19, and 20 respectively, for the purpose of determining the conductivity of each identifying contact 18, 19, and 20. Identifying probe pairs 42, 44, and 46 are controlled by CPU 55 from connection to I/O bus 53. Typically, a small current will flow across the discrete elements of identifying probe pairs 42, 44, and 46 causing a Low Level Voltage to be sensed by CPU 55 if the identifying contact was conductive. If current does not flow across the probe pairs 42, 44 and 46, the identifying contact was not conductive and a High Level Voltage is sensed by CPU 55. The identification information is used by the CPU 55 to produce a superior resultant printed image and properly placed relative to the preformed authenticating information 70.

It will be well understood by one skilled in the art that additional identifying contacts 18, 19 and 20 can be used within the scope of the invention as well as other combinations of receivers 30 and colorant donor element 21 which are likely to be desired by users of the apparatus.

Figure 6:
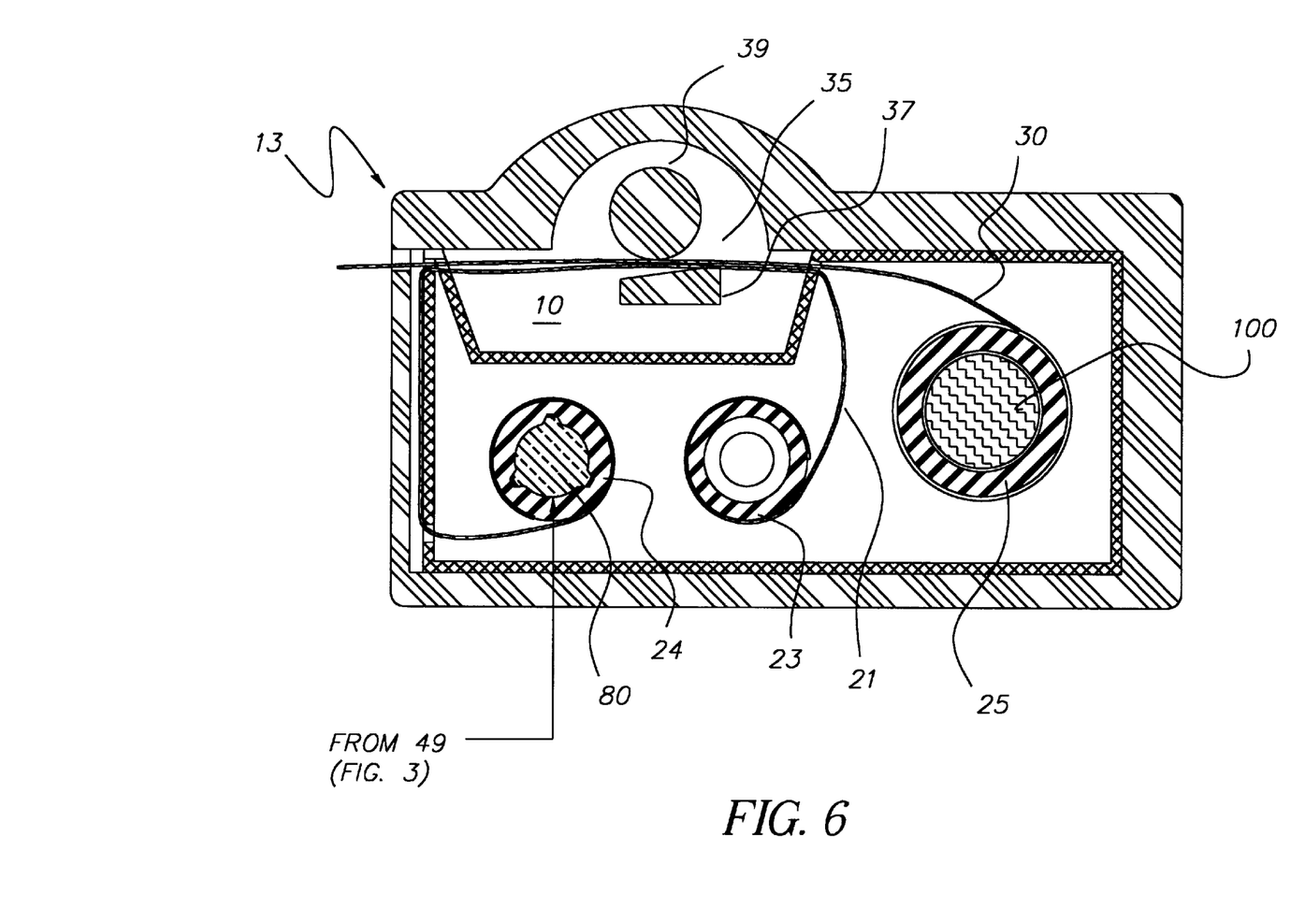
FIG. 6 is a sectional view taken along lines D—D of the printer of FIG. 1 showing in cross section an insertable thermal printer cartridge inserted into the thermal printer of the digital camera.

FIG. 6 is a sectional view taken along lines D—D of FIG. 1 which shows the insertable thermal printer cartridge 10 loaded into thermal printer 13. In this figure, the receivers 30 are shown in proximate position to colorant donor element 21 with respect to the thermal head 37 in the print station 35. In a manner well known in the art, receivers 30 are moved relative to the colorant donor element 21 to align the image pixels delivered by the thermal head 37 relative to the preformed authenticating information 70 on the receiver 30. The receiver 30 receives colorant at predetermined positions through a plurality of conventional heating elements (not shown) which are included in the thermal head 37. Pressure roller 39 of the thermal printer 13 works in cooperation with the thermal head 37 to maintain proper contact and alignment between colorant donor element 21 and receivers 30 to effectively create a color print.

Continuing with FIG. 6, cartridge RF transponder 100 is shown within receiver supply spool 25 where it is sealed at the time of manufacture. In the above-referenced specification from Texas Instruments, cartridge RF transponder 100 does not require external connections as it acquires its power from the electromagnetic signals of the interrogating RF transponder 102. In fact, within the structure of the digital camera 11, the orientation of the cartridge RF transponder 100 is not important for effective communication.

Figure 7:
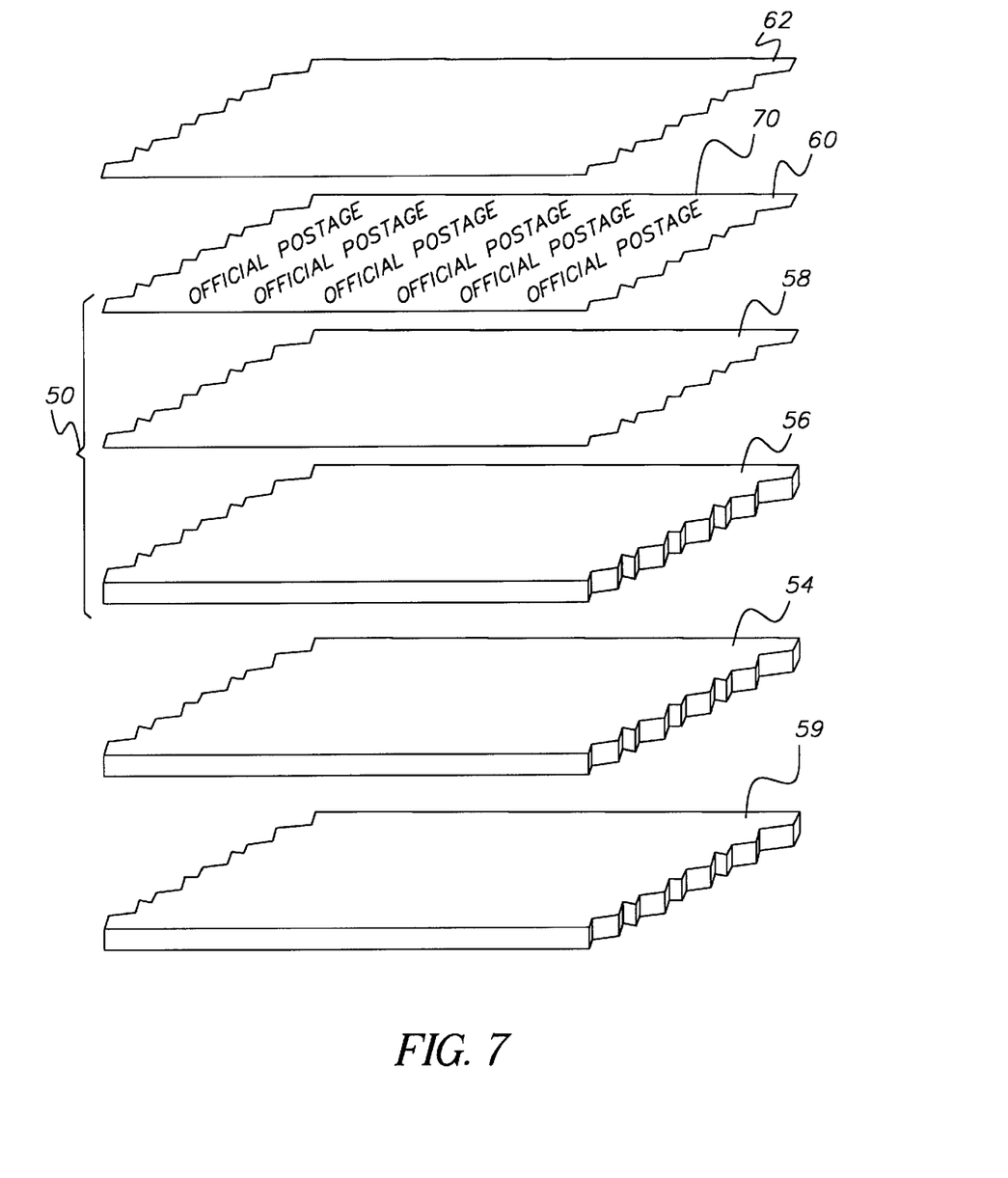
FIG. 7 is an exploded cross-sectional view showing various layers of a receiver with preformed authenticating information.

Now referring to FIG. 7, receiver 30 includes an image receiving structure 50 which is formed on a support 56. The support 56 can be formed of paper or plastic such as polyethylene terephthalate or polyethylene napthalate. Alternatively, it can be in the form of a web. In this embodiment an adhesive layer 54 is provided on the back surface of the support 56. A peelable protective release layer 59 is provided over the adhesive layer 54 until it is to be used for securing the image receiving structure 50 to a surface. This type of construction is particularly suitable when a series of images 90 (See FIG. 9) and the preformed authenticating information 70 which can be peeled apart for use, e.g., postal stamps. The image receiving structure 50 includes in sequence three layers, the support 56, a barrier layer 58 and the colorant receiving layer 60. At the time of manufacture of the colorant receiving layer 60 preformed authenticating information 70 are formed on the colorant receiving layer 60 which authenticate images to be formed. The preformed authenticating information 70 can be in the form of a bar code, an official seal, alphanumeric data or encoded digitized information.

A plurality of dye donor resistive elements of thermal head 37 (not shown) which are in contact with the colorant donor element 21. When a dye donor resistive elements is energized it is heated which causes dye to transfer from the colorant donor element 21 to the receiver 30 in a pattern to provide the colored image. This process is repeated until an image 90 is formed on each of the image receiving structures 50. During the final pass a protective layer 62 is then formed on the color receiving layer 60.

Figure 8:
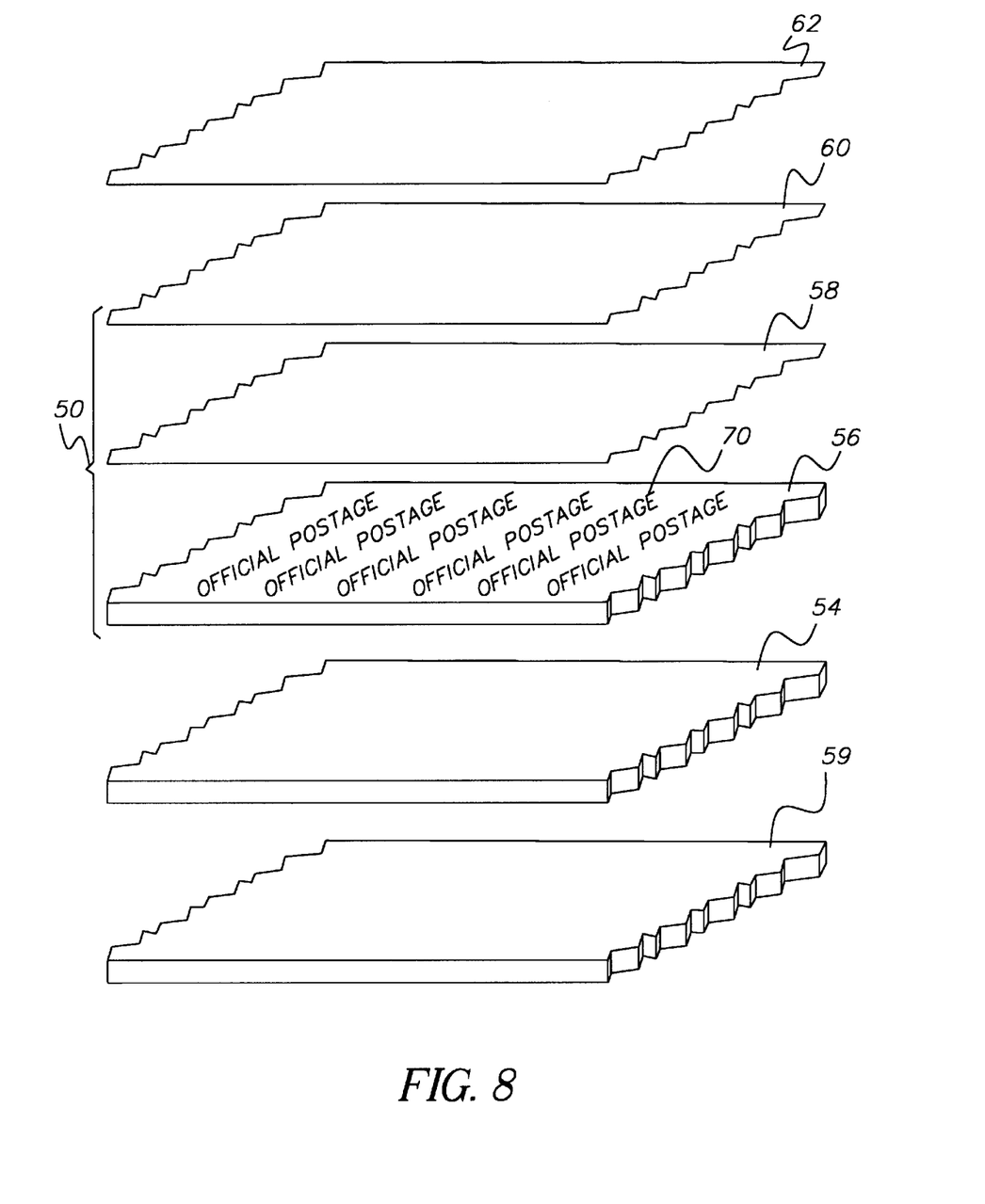
FIG. 8 is an exploded view of an embodiment of a receiver with preformed authenticating information.

At the time of manufacture of the receiver 30, preformed authenticating information 70 can also be formed on the support 56, as shown in FIG. 8. The creation of the preformed authenticating information 70 is described in the above-mentioned commonly-assigned U.S. patent application Ser. Nos. 09/103,019 and 09/165,066.

Figure 9:
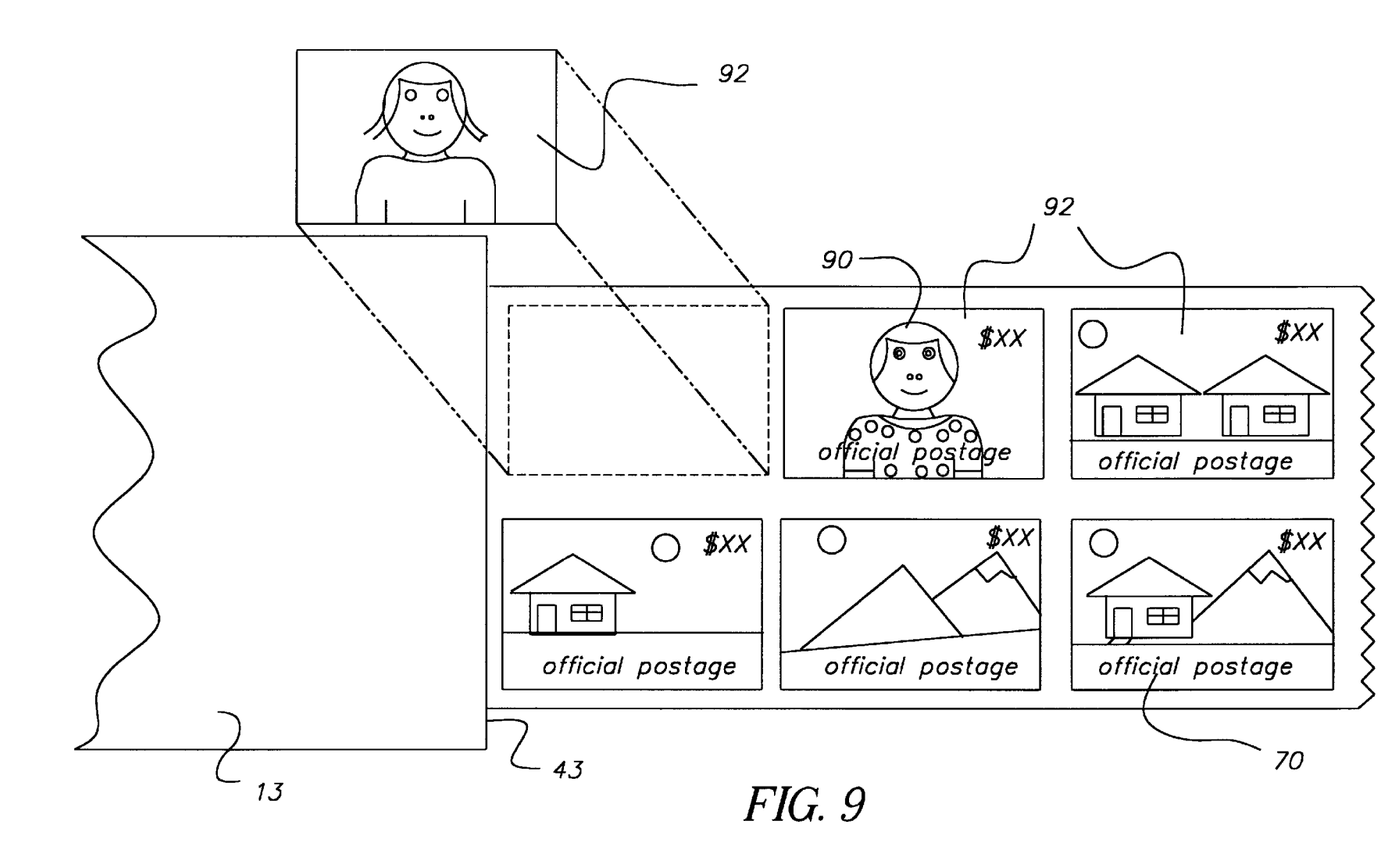
FIG. 9 shows a plurality of peelable stickers having images formed from the captured digitized scene image and preformed authenticating information which authenticate such captured digitized scene images in the receiver of FIG. 7.

Turning now to FIG. 9 which shows the output of the thermal printer 13 which is a series of preformed authenticating information 70 and an image 90 on peelable stickers 92. These peelable stickers 92 can be used as postal stamps. The peelable stickers 92 correspond to the image receiving structure 50 shown in FIG. 7. It is desirable that the preformed authenticating information 70 on the receiver 30 be highly accurate so that they may not be counterfeited. As is well known in the art, the receiver 30 in a web form can be run through a gravure process. For that purpose, the preformed authenticating information 70 are created in the receiver 30 when the receiver 30 is in a web form by using a gravure process. The preformed authenticating information 70 are formed with a high level of detail so that they are difficult to duplicate. The preformed authenticating information 70 have a high level of detail so that when an image 90 is formed during the thermal printing process, the preformed authenticating information 70 will be visible indicating to a viewer or reader of the receiver 30 that the images are authentic. The gravure process is capable of creating preformed authenticating information 70 of very high resolution, well beyond the capabilities of most common printers. The gravure process is an intaglio process. It uses a depressed or sunken surface for the preformed authenticating information 70. The preformed authenticating information 70 include cells or welds etched into a copper cylinder and the unetched surface of the cylinder represents the non-printing areas. The cylinder rotates in a bath of ink. Gravure printing is considered excellent for printing highly detailed marks or pictures that create the preformed authenticating information 70. High cylinder making expense usually limits gravure for long runs. Different types of inks may be used for depositing the preformed authenticating information 70 by the gravure process on the receiver 30 which can be used in the thermal printer 13 of FIG. 1.

The colorants used to form the preformed authenticating information 70 in the receiver 30 can be inks, dyes or pigments. Inks used in gravure printing are generally solvent based having fluid properties that allow them to fill the wells of the engraved cylinders or plates without spreading outside of these wells, yet are drawn out when contacted by the receiver 30 which is run in a web form through the gravure process. The binder solvent used in the formulation is such that the inks dry by evaporation and have good adhesion to the receiver 30. These inks are well known in the art and are described in detail in the Graphic Arts Manual, Arno Press, Musarts Publishing Corp., New York, N.Y., 1980; specifically in the chapters titled "Inks in Common Use", Theodore Lustig, Sun Chemicals Corp. and Introduction to Printing Inks, Gary G. Winters, Inmont Corporation.

The preformed authenticating information 70 can be formed of fluorescent materials which fluoresce under certain lighting conditions. When the colorants are inks or dyes of the type that fluoresce and are invisible to the unaided eye as described in commonly assigned U.S. Pat. Nos. 5,752,152; 5,772,250; 5,768,674; 5,864,742 and U.S. patent application Ser. Nos. 08/598,785; 08/873,959; the disclosures of which are incorporated by reference. The colorants can be for example comprised of inks or dyes that can be seen using infrared light with a wave length between 10-6 meters and 10-3 meters, or colorants comprised of inks or dyes that can be seen using ultraviolet light with a wave length between 10-8 meters and 10-7 meters. Alternatively, the preformed authenticating information 70 can be formed from dye from a material which disappears under non-ambient lighting conditions. Various combinations of colorant preformed authenticating information 70 and embossed preformed authenticating information 70 with the colorants formed of different materials will suggest themselves to those skilled in the art.

The invention has been described in detail with particular reference to certain preferred embodiments thereof, but it will be understood that variations and modifications can be effected within the spirit and scope of the invention.

| PARTS LIST | |
|---|---|
| 8 | shutter button |
| 9 | thermal printer cartridge housing |
| 10 | insertable thermal printer cartridge |
| 10a | thermal printer cartridge bay |
| 11 | digital camera |
| 13 | thermal printer |
| 16 | cartridge seal |
| 17 | drive sprocket |
| 18 | identifying contacts |
| 19 | identifying contacts |
| 20 | identifying contacts |
| 21 | colorant donor element |
| 22 | adhesive |

-continued

| PARTS LIST | |
|---|---|
| 23 | donor supply roll |
| 24 | take-up spool |
| 25 | receiver supply spool |
| 29 | cartridge bay door |
| 30 | receiver |
| 35 | print station |
| 37 | thermal head |
| 39 | pressure roller |
| 40 | image sensor |
| 42 | identifying probe |
| 43 | printer egress slot |
| 44 | identifying probe |
| 45 | single chip image processor |
| 46 | identifying probe |
| 47 | LCD window |
| 48 | lens |
| 49 | printer controller IC |
| 50 | image receiving structure |
| 51 | memory |
| 53 | I/O bus |
| 54 | adhesive layer |
| 55 | central processing unit |
| 56 | support |
| 58 | barrier layer |
| 59 | protective release layer |
| 60 | colorant receiving layer |
| 62 | protective layer |
| 70 | preformed authenticating information |
| 72 | A/D Converter |
| 80 | donor drive shaft |
| 84 | gear |
| 86 | motor |
| 90 | images |
| 92 | peelable stickers |
| 100 | cartridge RF transponder |
| 102 | RF transponder |
| 104 | antenna |
| 106 | RF receiving and sending unit |
| 108 | Bitstream converter |
| 110 | RF receiving and sending unit |
| 111 | Antenna |
| 112 | RF converter |

What is claimed is:

1. A digital camera including a printer for printing images onto a receiver having preformed authenticating information, the receiver being formed in a cartridge which is insertable into the printer, comprising:

(a) the camera including:
   capturing means for capturing and digitizing an image of a scene, and
   storing means for storing the captured digitized scene image;

(b) the cartridge including security control circuitry having a predetermined code for enabling the printer;

(c) the printer including:
   (i) a print station adapted to print the captured digitized scene image in relation to the preformed authenticating information on the receiver; and
   (ii) means for receiving the cartridge having the receiver and for advancing the receiver past the print station; and (d) logic and controlling means for performing logic and control and including:
   enabling means responsive to the inserted cartridge for receiving the predetermined code to enable the printer, and
   advancing means responsive to the captured digitized scene image for causing the advancing means to advance the receiver past the print station and for providing signals to the enabled printer in response to the captured digitized scene image for causing the printer to print an image on the receiver in relation to the performed authenticating information on the receiver.

2. The digital camera of claim 1 wherein a plurality of images of the captured digitized scene image are formed on the receiver.

3. The digital camera of claim 2 wherein the receiver includes an image receiving structure to which a series of user viewable images of the captured digitized image scene are formed such as postal stamps, the image receiving structure further comprising:

(e) a support having first and second surfaces including preformed authenticating information;

(f) a barrier layer formed on the first surface of the support; and (g) a colorant receiving layer formed on the barrier layer to which a series of images can be transferred.

4. The digital camera of claim 1 further including an antenna and RF transponder for sending and receiving radio signals and wherein the cartridge includes a cartridge RF transponder for sending and receiving radio signals and in response to a received signal from the RF transponder the cartridge RF transponder sends a signal having the predetermined code to the antenna which transmits such signal to the RF transponder, and wherein the logic and control means includes means coupled to the RF transponder for receiving the predetermined code to enable the printer.

5. The digital camera of claim 4 wherein the cartridge RF transponder includes a counter having a number corresponding to the number of receivers included in the cartridge and wherein the counter is decremented each time the printer is actuated.

6. A digital camera including a printer for printing images onto a receiver, the receiver being provided in a cartridge which is insertable into the printer having preformed authenticating information on peelable stickers, comprising:

(a) the camera including
capturing and storing means for capturing and digitizing an image of a scene and for storing the captured digitized scene image;

(b) the cartridge including security control circuitry having a predetermined code for enabling the printer;

(c) the printer including:
(i) a print station adapted to print the captured digitized scene image in relation to the preformed authenticating information on the receiver; and
(ii) means for receiving the receiver and for advancing the receiver past the print station; and (d) logic and controlling means for performing logic and control and including:

enabling means responsive to the inserted cartridge for receiving the predetermined code to enable the printer, and advancing means responsive to the captured digitized scene image for causing the advancing means to advance the receiver past the print station and for providing signals to the enabled printer in response to the captured digitized scene image for causing the printer to print an image on one or more stickers on the receiver in relation to the preformed authenticating information on one or more stickers on the receiver.

7. The digital camera of claim 6 further including an antenna and RF transponder for sending and receiving radio signals and wherein the cartridge includes a cartridge RF transponder for sending and receiving radio signals and in response to a received signal from the RF transponder the cartridge RF transponder sends a signal having the predetermined code to the antenna which transmits such signal to the RF transponder, and wherein the logic and control means includes means coupled to the RF transponder for receiving the predetermined code to enable the printer.

8. The digital camera of claim 7 wherein the cartridge RF transponder includes a counter having a number corresponding to the number of peelable stickers included in the cartridge and wherein the counter is decremented each time the printer is actuated.

9. A digital camera, comprising:
a sensor capturing and digitizing an image of a scene and storing the captured digitized scene image;
a cartridge comprising:
security control circuitry with a predetermined code; and
a receiver being formed in the cartridge and having preformed authenticating information formed on the receiver;
a printer printing images on to the receiver, the cartridge being insertable into the printer, the printer being enable by the predetermined code and comprising:
a print station printing the captured digitized scene image in relation to the preformed authenticating information on the receiver; and
a mechanism receiving the cartridge and advancing the receiver past the print station; and
a logic and control unit responsive to the inserted cartridge, receiving the predetermined code to enable the printer, causing the advancing means to advance the receiver past the print station, providing signals to the enabled printer in response to the captured digitized scene image and causing the printer to print an image on the receiver in relation to the performed authenticating information on the receiver.

* * * * *